(12) United States Patent
Magnani et al.

(10) Patent No.: US 11,216,855 B2
(45) Date of Patent: Jan. 4, 2022

(54) SERVER COMPUTER AND NETWORKED COMPUTER SYSTEM FOR EVALUATING, STORING, AND MANAGING LABELS FOR CLASSIFICATION MODEL EVALUATION AND TRAINING

(71) Applicant: Wal-Mart Stores, Inc., Bentonville, AR (US)

(72) Inventors: Alessandro Magnani, Menlo Park, CA (US); Jianhui Zhang, Milpitas, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 796 days.

(21) Appl. No.: 14/980,729

(22) Filed: Dec. 28, 2015

(65) Prior Publication Data

US 2017/0124615 A1 May 4, 2017

Related U.S. Application Data

(60) Provisional application No. 62/250,940, filed on Nov. 4, 2015.

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0627* (2013.01)

(58) Field of Classification Search
CPC .................. G06F 17/30312; G06F 17/30392
See application file for complete search history.

(56) References Cited

U.S. PATENT DOCUMENTS

| | | | |
|---|---|---|---|
| 7,958,067 B2* | 6/2011 | Schmidtler | G06Q 10/10 706/20 |
| 2015/0179165 A1* | 6/2015 | Mohamed | G06Q 30/01 704/251 |
| 2015/0242761 A1* | 8/2015 | Amershi | G06N 99/005 706/11 |

OTHER PUBLICATIONS

Ipeirotis, Panagiotis, Repeated Labeling Using Multiple Noise Labelers, Mar. 16, 2013, Data Mining and Knowledge Discovery, vol. 28, Issue 2, pp. 402-441 (Year: 2013).*

\* cited by examiner

*Primary Examiner* — Jeffrey A. Smith
*Assistant Examiner* — Timothy J Kang
(74) *Attorney, Agent, or Firm* — Bryan Cave Leighton Paisner LLP

(57) ABSTRACT

A system for use in monitoring an operation of a classification model in generating estimated labels for item records is described herein. The system receives a current labeling budget value including a number of trusted labels available for use in a labeling operation, determines a current selection probability for each item record included in an item list as a function of the current labeling budget value, selects a plurality of item records from the item list as a function of each corresponding current selection probability, and generates a sampling list including the selected item records. The system determines a risk measurement value associated with the classification model indicating an accuracy of the estimated labels as compared to trusted labels associated with the item records.

20 Claims, 10 Drawing Sheets

| Item ID | Item Description | Estimated Classification Label | Selection Probability | Selected (Y/N) |
|---|---|---|---|---|
| 001 | 18" FS18 Boys BMX Bicycle | Sporting Goods, Bicycle | .01% | N |
| 002 | Granite 18" wheel bike | Kitchen, appliance | .05% | Y |
| 003 | Granite Peak 24" Bike Helmet | Sporting Goods, Bicycle | 1.0% | Y |
| 004 | 18" Mongoose Switch Boys' Freestyle Bike | Sporting Goods, Bicycle | .07% | N |

FIG. 12

| Item ID | Item Description | Trusted Classification Label |
|---|---|---|
| 002 | Granite 18" wheel bike | Sporting Goods, Bicycle |
| 003 | Granite Peak 24" Bike Helmet | Sporting Goods, Accessories |

FIG. 13

| Item ID | Item Description | Estimated Classification Label | Previous Selection Probability | Current Selection Probability | Selected (Y/N) |
|---|---|---|---|---|---|
| 001 | 18" FS18 Boys BMX Bicycle | Sporting Goods, Bicycle | .01% | 0.5% | Y |
| 002 | Granite 18" wheel bike | Kitchen, appliance | .05% | .01% | Y |
| 003 | Granite Peak 24" Bike Helmet | Sporting Goods, Bicycle | 1.0% | 0.7% | N |
| 004 | Mongoose Switch Boys' Freestyle Bike | Sporting Goods, Accessories | .07% | 0.8% | N |
| 1200 | 18" Misty Girls' Bike | Sporting Goods, Bicycle | 0.0% | .01% | Y |
| 1501 | Boys' Freestyle Bike | Sporting Goods, Bicycle | 0.0% | .07% | N |

FIG. 14

| Item ID | Item Description | Estimated Classification Label | Previous Selection Probability | Current Selection Probability | Selected (Y/N) | Set ID |
|---|---|---|---|---|---|---|
| 001 | 18" FS18 Boys BMX Bicycle | Sporting Goods, Bicycle | .01% | 0.5% | Y | Training |
| 002 | Granite 18" wheel bike | Kitchen, appliance | .05% | .01% | Y | Test |
| 003 | Granite Peak 24" Bike Helmet | Sporting Goods, Bicycle | 1.0% | 0.7% | N | |
| 004 | Mongoose Switch Boys' Freestyle Bike | Sporting Goods, Accessories | .07% | 0.8% | N | |
| 1200 | 18" Misty Girls' Bike | Sporting Goods, Bicycle | 0.0% | .01% | Y | Test |
| 1501 | Boys' Freestyle Bike | Sporting Goods, Bicycle | 0.0% | .07% | N | |

FIG. 15

SERVER COMPUTER AND NETWORKED COMPUTER SYSTEM FOR EVALUATING, STORING, AND MANAGING LABELS FOR CLASSIFICATION MODEL EVALUATION AND TRAINING

CROSS-REFERENCES TO RELATED APPLICATIONS

This application claims priority to U.S. Provisional Patent Application Ser. No. 62/250,940, filed on Nov. 4, 2015, which is hereby incorporated by reference in its entirety for all purposes.

FIELD OF THE DISCLOSURE

U.S. Patent Classification Primary Class: 707 (DATA PROCESSING: DATABASE, DATA MINING, AND FILE MANAGEMENT OR DATA STRUCTURES. Art Unit: 2161.

The present invention relates to classification models for use in assigning labels to items, and more particularly, to systems, methods, and computer-readable storage media that monitors the performance of classification models used for labeling data records associated with consumer products using statistical analysis and item sampling.

BACKGROUND

Many consumers desire to order items or goods remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria.

At least some known system include classification servers that generate product listings that are stored in databases for use by search engines to generate and display product lists to consumers. However, in at least some known classification systems, the information associated with product records may include information that is not relevant to and/or does not accurately describe the associated product, resulting search results that are not relevant to the corresponding search query.

In supervised learning it is necessary to have labeled training and test data to learn and evaluate a given computer labeling model. Collecting labels is generally an expensive operation and is important to minimize the number of labels required to both train and test the classification computer. At least one common approach when a large set of unlabeled items is available, is to label a randomly selected subsets of the items. The labeled data is then divided between a train and a test set at random. Even though this approach is commonly used, for a given number of labeled data points it might not be optimal and it might also not work well in some practical situations that are often encountered in a production system.

For example, a common situation is for the set of items under evaluation to change over time. In such a case, the labeled test dataset might not be fully representative of the whole set and any evaluation of a corresponding computer model might be in error for the new set of items. A simple solution is to sample a new test data set every time an evaluation is required, however, this is clearly very expensive and wasteful because the previously acquired test data is not able to be reused. Another situation that very often arises includes multiple labeled data sets that have been obtained from subsets of the whole space of items. Simply using the union of such test datasets is incorrect in general because the test datasets might not be representative of the whole set of items. In this case as well, a simple solution is to sample a new test data set for evaluation. Again this approach would be expensive and wasteful.

Because the number of items that may be included in a product database may increase overtime, significant computing time and resources are required to determine the accuracy of classifications systems used to label each of the corresponding item records that are used in response to search queries requested by consumers. As the amount of product records being included in a database increases, the amount of computing time and resources that are required to determine the accuracy of classifications systems used to label item records for use in response to search queries requested by consumers increase, thus reducing the overall performance of known computer web hosting systems.

The present invention is aimed at one or more of the problems identified above.

SUMMARY OF THE INVENTION

In different embodiments of the present invention, systems, methods, and computer-readable storage media allow users to display relevant product information to a consumer via a website.

In one embodiment, a networked computer system is provided. The networked computer system includes a classification server computer, an evaluation server computer, and a database. The classification server computer includes a processor that is programmed to perform labeling operations including assigning estimated labels to item records. The estimated labels including information associated with the item records. The database includes an item list that includes a plurality of item records. Each of the item records includes an initial selection probability associated with a previous sampling operation. The evaluation server computer includes a processor that is programmed to receive a current labeling budget value including a number of trusted labels available for use in a current sampling operation, determine a current selection probability for each item record included in the item list as a function of the current labeling budget value and each corresponding initial selection probability, select a plurality of item records from the item list as a function of each corresponding current selection probability, and generate a sampling list including the selected item records. The number of item records included in the sampling list is equal to the current labeling budget value. The evaluation server computer determines an estimated label associated with each item record included in the sampling list, wherein each estimated label is determined as a function of a current labeling operation performed by the classification server computer, determines a risk measurement value associated with the current labeling operation, and displays the risk measurement value on a user computing device. The risk measurement value is determined as a function of the estimated labels and each corresponding current selection probability and indicates an accuracy of the estimated labels as compared to trusted labels associated with the item records.

In another embodiment, an evaluation server computer for use in monitoring an operation of a classification server computer is provided. The classification server computer performs labeling operations that include assigning estimated labels to item records. The estimated labels include information associated with the item records. The evaluation computer server comprises a database and a processing device including a processor coupled to a memory device. The database includes an item list that includes a plurality of item records. Each of the item records includes an initial selection probability associated with a previous sampling operation. The processor is programmed to receive a current labeling budget value including a number of trusted labels available for use in a current sampling operation, determine a current selection probability for each item record included in the item list as a function of the current labeling budget value and each corresponding initial selection probability, select a plurality of item records from the item list as a function of each corresponding current selection probability, and generate a sampling list including the selected item records. The number of item records included in the sampling list is equal to the current labeling budget value. The processor is further programmed to determine an estimated label associated with each item record included in the sampling list, wherein each estimated label is determined as a function of a current labeling operation performed by the classification server computer, determine a risk measurement value associated with the current labeling operation, and display the risk measurement value on a user computing device. The risk measurement value is determined as a function of the estimated labels and each corresponding current selection probability, and indicates an accuracy of the estimated labels as compared to trusted labels associated with the item records.

In yet another embodiment, one or more non-transitory computer-readable storage media, having computer-executable instructions embodied thereon are provided. When executed by at least one processor, the computer-executable instructions cause the processor to receive a current labeling budget value including a number of labels available for use in a current sampling operation, access a database including an item list including a plurality of item records, wherein each of the item records including an initial selection probability associated with a previous sampling operation, determine a current selection probability for each item record included in the item list as a function of the current labeling budget value and each corresponding initial selection probability, select a plurality of item records from the item list as a function of each corresponding current selection probability, and generate a sampling list including the selected item records. The number of item records included in the sampling list is equal to the current labeling budget value. The processor determines an estimated label associated with each item record included in the sampling list, wherein each estimated label is determined as a function of a current labeling operation being performed by a classification server computer, determines a risk measurement value associated with the current labeling operation, and displays the risk measurement value on a user computing device. The risk measurement value is determined as a function of the estimated labels and each corresponding current selection probability, and indicates an accuracy of the estimated labels as compared to trusted labels associated with the item records.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 12-15 are illustrations of exemplary database records generated by the system of FIG. 1, according to embodiments of the present invention;

Figure 1:
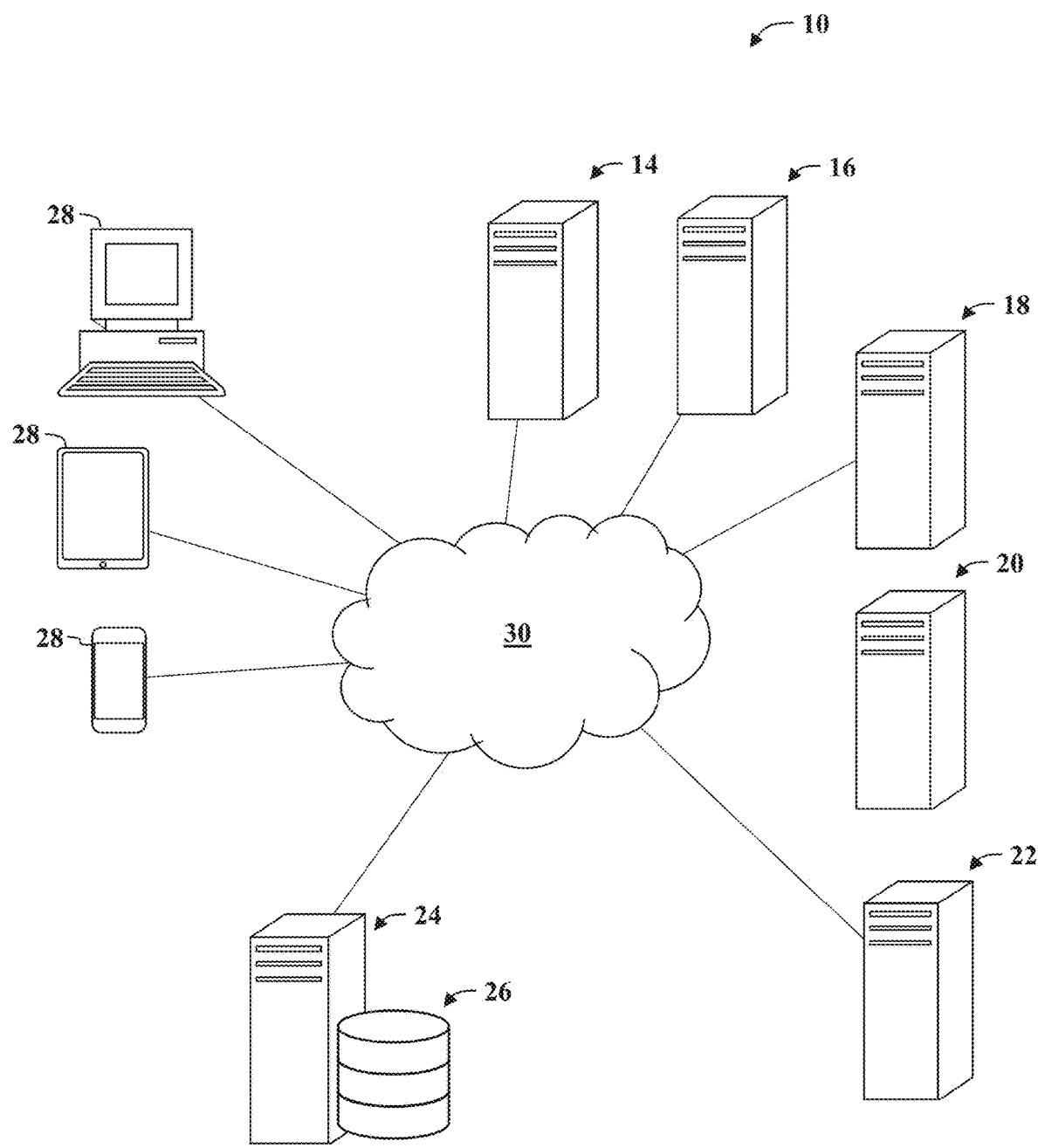
FIG. 1 is a schematic illustrating various aspects of a system, according to the present disclosure.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the present invention describes a computer network system 10 that includes a classification server computer that assigns labels to a plurality of item records, and an evaluation server computer that measures the performance of the classification server. The classification server computer is programmed to execute a classification model that assigns estimated labels to a plurality of item records. The evaluation server computer selects a subset of the item records with estimated labels, compares the estimated labels with trusted labels, and measure the accuracy of the classification model based on the comparison of the estimated label with the trusted label. The item records may represent any suitable collection of related data sets such as, for example, records of consumer products, population data, and/or any data sets that are suitable for statistical analysis.

The need to correctly evaluating classification models is critical and requires labels, however, labeling products is expensive. Accordingly, there is a need to provide a system that is capable of correctly and optimally using labels. In one embodiment, a measuring the accuracy of classification models may include sampling item records uniformly at random N items to produce a sampling profile 12 shown in FIG. 7, and compute the accuracy using the following equation:

$$\frac{1}{N}\sum_{i=1}^{N} \mathbb{1}_{\{\hat{y}_i = y_i\}} \quad \text{Equation 1}$$

Figure 7:
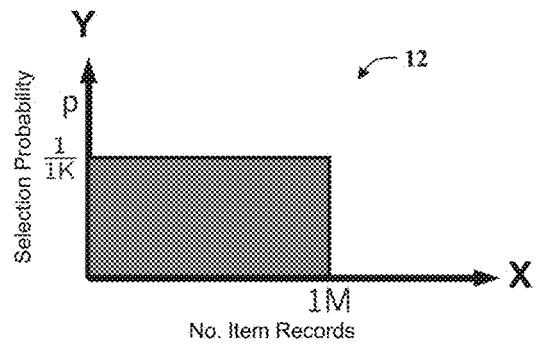

For example, in one embodiment, the system may be required to computer the accuracy of 1,000,000 items, with a labeling budget of 1,000 labels. The system may determine the selection probability of each of the items based on the total number of items and the amount of labels in the labeling budget. For example, the system may determine the selection probability of each item to be equal to 0.001% to produce a sampling profile 12 as shown in FIG. 7. The system may select 1,000 items from the 1 million items, compare the 1,000 labels with the selected 1,000 items and measure the measure accuracy using the following equation:

$$\frac{1}{1K}\sum_{i=1}^{1K} \mathbb{1}_{\{\hat{y}_i = y_i\}} \quad \text{Equation 2}$$

In one embodiment, during operation, the number of items changes over time and evaluations are required over multiple subsets. Existing labels may be potentially difficult to reuse. For example, during operation, the system may receive an additional 500,000 items and is required to compute the accuracy over the total item set including 1.5 million items. Using the previous accuracy measurement will most likely be inaccurate. The system may also receive an additional 500 labels of extra labeling budget. In one embodiment, the system may determine a selection probability of each item based on the new labeling budget to product the sampling profile 12 shown in FIG. 8, and sample 500 items from the 1.5 million items and computer a new accuracy on the new 500 labels, however, this does not make use of the previous 1,000 labels.

Figure 9:
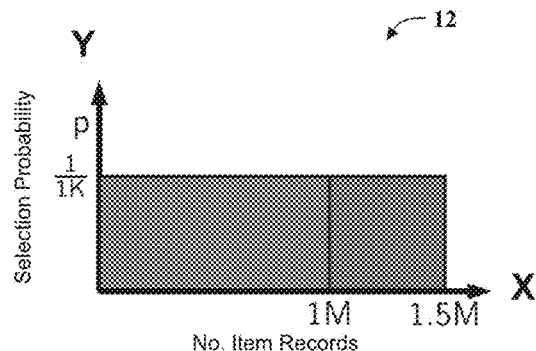

In another embodiment, the system may assign a selection probability to the new 500 labels based on the additional label budget to produce the sampling profile 12 shown in FIG. 9. Using this sampling profile 12, the system may sample 500 items from the new 500,000 items that have been added and computer a weighted accuracy measurement. By using a weighted accuracy measurement, the previous 1,000 labels are used in the measurement calculation and are not wasted.

For example, the system may receive only receive an additional 250 labels of extra labeling budget for use measuring accuracy of the 1.5 million items. In this example, the system determines a selection probability associated with the additional 500,000 items based on the new 250 labels to produce the sampling profile shown in FIG. 10. The system then determines the accuracy of the classification model using a weighted accuracy measurement using the following equation:

$$\frac{1}{1.5K}\left(\sum_{i=1}^{1K} \mathbb{1}_{\{\hat{y}_i = y_i\}} + 2\sum_{i=1}^{250} \mathbb{1}_{\{\hat{y}_i^{new} = y_i^{new}\}}\right) \quad \text{Equation 3}$$

The system is configured to address the following challenges: sampling new test labels for every measure is generally expensive; knowing how previous labels were sampled required to optimally sample new items for test; computing accuracy using all labels requires knowledge of sampling profile; and overtime reusing labels can become very tricky. In one embodiment, the system may determine $p_i$ as the probability of item i to be selected for test (Bernoulli). Each item carries $p_i$ and is marked if selected (e.g. store the sampling profile in a database). In one embodiment, the system may determine accuracy of the classification system using the following equation:

$$\frac{1}{\sum_{i \, selected} \frac{1}{p_i}} \sum_{i \, selected} \frac{1}{p_i} \mathbb{1}_{\{\hat{y}_i = y_i\}} \quad \text{Equation 4}$$

For evaluation to be possible, $p_i > 0$ for all i labeled/unlabeled. All labels are used. With uniform sampling this is simply "standard" accuracy, and is very closely related to importance sampling. Given existing sampling $p_i$ and extra budget, using Equation 4, the system generates a sampling profile 12 shown in FIG. 6 to minimize accuracy variance with budget constraint, which can be formulated as an optimization problem, and may be easy to solve. New budget used more where pi is smaller, and given enough budget the system may obtain uniform sampling.

In addition, the system framework works more generally for supervised learning; the framework can work with a wide range of different metrics; optimal sampling can use model posterior to reduce variance; and the framework can be used on the training side together with active learning.

For example, in one embodiment, the item records may include information associated with consumer products that are being displayed to consumer via a website, with each item record including information associated with a corresponding product description. The classification server computer may access the items records and execute a labeling operation including a classification model to assign product classification to each of the item records based on the corresponding product descriptions. The product classifications may be used to enable a search engine to retrieve and display item records based on search queries received through a product website. The evaluation server computer is programmed to monitor the operation of the classification server including selecting a subset of the labeled item records, comparing the estimated labels associated with the subset of labeled item records with trusted labels, and determining an accuracy of the classification model based on a comparison of the estimated labels with the trusted labels. The evaluation server computer is also programmed to display a performance measurement indicating the accuracy of the classification model to a user to allow the user to make adjustments to the classification model.

In the illustrated embodiment, the system is programed to store labeled data and information on how the label data was collected, sample items for labeling optimally given a requested estimation or active learning strategy, and reuse any available labels in any successive evaluation. The system may be programed to conduct testing of the collection model and/or perform training for the collection model. The system may also be configured to estimate the risk of a classification model in a dynamic environment including rapid changes in the number of item records being included with the system.

With reference to the FIGS. and in operation, the present invention provides a system 10, methods and computer product media that monitors the performance of a classification model that automatically assigns estimated labels to a plurality of item records. Referring to FIG. 1, an exemplary environment in which the system 10 operates is illustrated. In the illustrated embodiment, the system 10 is configured to enable a user to access a website with one or more user computing devices to view information indicative of products that may be purchase by the user via the website.

The system 10 receives a plurality of item records associated with consumer products and executes a classification model to provide estimated labels for each of the item records for use in displaying a product search webpage in response to a search query entered by the user via the webpage. In addition, the system monitors the operation of the classification model by selecting a subset of the labeled item records, comparing the estimated labels associated with the subset of labeled item records with trusted labels, and determining an accuracy of the classification model based on a comparison of the estimated labels with the trusted labels.

By providing a system that automatically classifies item records and monitoring the accuracy of the classification model, the system 10 generates and displays search results that are more relevant to the needs of the consumer over known search engines. Thus increasing the likelihood of a consumer purchasing a product displayed in the list and increasing the overall revenue being generated by the website. For example, the system provides relevant product listings without requiring the consumers to input multiple search queries and/or product categories, thus reducing the effort required by the consumer to retrieve the desired products from the website.

In addition, by providing classification labels and monitoring label accuracy, the system 10 improves the speed and functionality of known computing systems by reducing the amount of product records being retrieved from a search request and being displayed in response to a user's search request, thus reducing the computing resources required to generate and display relevant search results.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 14, a search engine server 16, a classification server 18, a trusted labeling server 20, a model evaluation server 22, a database server 24, a database 26, and one or more user computing devices 28 that are each coupled in communication via a communications network 30. The communications network 30 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed. Each server may include a server computer that includes a processing device that includes a processor that is coupled to a memory device. The processing device executes various programs, and thereby controls components of the server according to user instructions received from the user computing devices and/or other servers. The processing device may include memory, e.g., read only memory (ROM) and random access memory (RAM), storing processor-executable instructions and one or more processors that execute the processor-executable instructions. In embodiments where the processing device includes two or more processors, the processors can operate in a parallel or distributed manner. The processing device may also include a memory device for storing programs and information in the database 26, and retrieving information from the database 26 that is used by the processor to perform various functions described herein. The memory device may include, but is not limited to, a hard disc drive, an optical disc drive, and/or a flash memory drive. Further, the memory device may be distributed and located at multiple locations.

The user computing device 28 may include any suitable device that enables a user to access and communicate with the system 10 including sending and/or receiving information to and from the system 10 and displaying information received from the system 10 to a user. For example, in one embodiment, the user computing device 28 may include, but is not limited to, a desktop computer, a laptop or notebook computer, a tablet computer, smartphone/tablet computer hybrid, a personal data assistant, a handheld mobile device including a cellular telephone, and the like.

The database server 24 includes a memory device that is connected to the database 26 to retrieve and store information contained in the database 26. The database 26 contains information on a variety of matters, such as, for example, web pages associated with one or more websites, search queries, customer account information, product records, product images, product information, item records, item description information, estimated item records, trusted labels, selection probabilities, labeling budget values, accuracy measurement values, risk measurement values, and/or any suitable information that enables the system 10 to function as described herein. The data and/or records contained in the database 26 may include searchable data terms including characters, symbols, letters, numbers, words, phrases, images, and the like.

Figure 11:
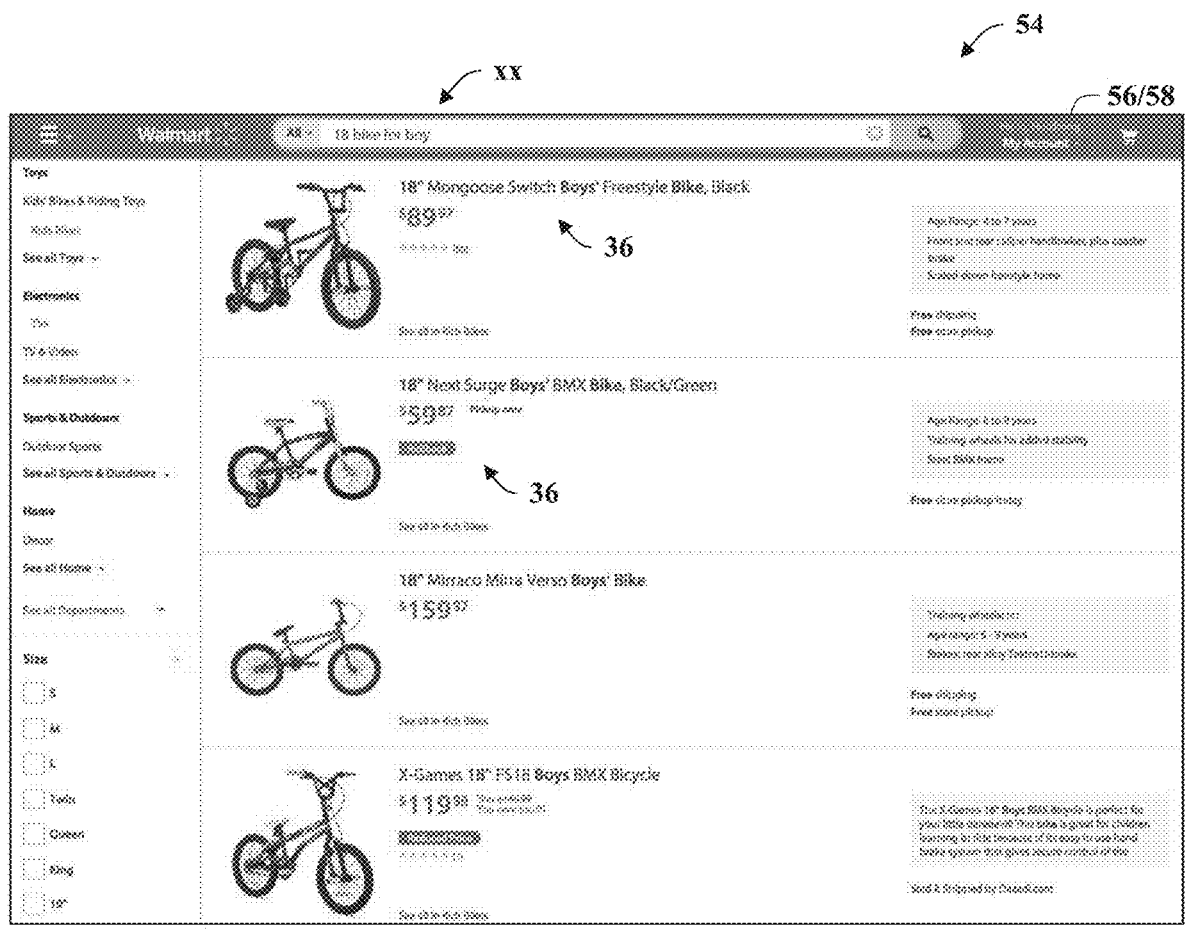

For example, in one embodiment, the database 26 may contain an item list 32 (shown in FIGS. 12-15) including a plurality of item records 34 that are associated with a plurality of products 36 (shown in FIG. 11) being displayed via a website. Each item record 34 may include an item identifier 38 and an item description 40 including information associated with product information. For example, in one embodiment, the product information may include product titles and/or product descriptions associated with the product. The data contained in the item description 40 may include numerical values, image files, and/or textual information. In one embodiment, for example, the item record 34 may include product information including an image file (shown in FIGS. 11-15) of the product and a text file for use in displaying a corresponding product information on a webpage.

The item records 34 may also information associated with a classification model operation being conducted to assign labels to each of the item records 34. For example, in one embodiment, the item records 34 may includes estimated labels 42 including classification information association with consumer product information that may be used to retrieve and display the item records on a website. For example, the classification information may include predefined categories of consumer products (e.g. electronics, sporting goods, houseware, etc.) that are used to group item records 34 having one or more similar attributes to facilitate consumer product search queries performed by the search engine server 16. In another embodiment, the labels may include any suitable information that may associated and/or assigned to the item records 34. Item records 34 may also include selection probabilities 44 associated with sampling operations conducted to monitor the performance of the classification model and/or selection indicator 46 indicating if a corresponding item record 34 has been included in a sampling set. In addition, in one embodiment, the item record 34 may include a set identifier 48 indicating if the corresponding item record 34 is associated with a training set used during a system training operation or a test set including item records used during a system testing operation.

In one embodiment, the database may also include a trusted label list 50 (shown in FIG. 13) that includes item records 34 that include trusted labels 52 that are associated with the corresponding item record 34. The trusted labels 52 include information similar to the information included in the estimated labels 42 and are used to measure the accuracy of the estimated labels 42. For example, in one embodiment, the trusted label indicates the most accurate information associated with the item, and the accuracy of the classification model may be determined based on a comparison between the trusted labels and the estimated label.

The database 26 may also include customer account records that include information associated with consumers for use in identifying consumers. The information included in customer account records may including, but not limited to, a unique customer ID, username, password, name, customer address, purchase history, product search history, search query histories, and/or product preferences such as, for example, product category preferences, item attribute preferences, attribute value preferences, and the like. The customer account records may be used to identify a consumer that is accessing the website and determine preferred search queries.

The website hosting server 14 is configured to host a website 54 (shown in FIG. 11) that is accessible by a user via one or more user computing devices 28. The website hosting server 14 retrieves and stores web pages 56 associated with one or more websites 54 in response to requests received by the user via the user computing device 28 to allow users to interact with the website and search and/or purchase products such as, for example, goods and/or services via the website. In one embodiment, the website hosting server 14 is configured to generate and display web pages 56 associated with the website in response to requests being received from consumers via corresponding web browsers that are displayed on the user computing devices 28. For example, in one embodiment, the website hosting server 14 may display a product search webpage 58 (shown in FIG. 11) in response to receiving a user request that allows a user to input a product search request including search criteria including one or more search terms.

In one embodiment, the website hosting server 14 may allow customers to login and access corresponding customer accounts including account information such as, for example, previous purchase, pending orders, pending deliveries, and/or product preferences. For example, the website hosting server 14 may display a login page (not shown), receive a unique customer ID such as, for example, a username and/or password, and identify the customer account associated with the unique customer ID to enable the identified customer to access information and/or features associated with the corresponding customer account. In addition, the website hosting server 14 may transmit the product search request to the search engine server 16 for use in generating search data and/or product lists in response to the user's search request. The website hosting server 14 may also receive one or more product lists including item records 34 selected from the item list 32 by the search engine server 16 that includes information associated with products that are selected based on the user's search criteria. The website hosting server 14 may also display a search results webpage 56 to display the products 36 included in the product list to the user and to allow the user to select one or more of the displayed products for purchase.

In the illustrated embodiment, the search engine server 16 is configured to receive a product search request from the website hosting server 14 including one or more search terms, and generate search data including a plurality of product records as a function of the search terms. For example, in one embodiment, the search engine server 16 may initiate a search algorithm based on a Boolean model to search item records contained in the database 26 based search terms received from the user. The search engine server 16 may generate search data including item records 34 matching the search criteria, and generate a relevance score associated with each item record 34 included in the search data. In one embodiment, the relevance score may be determined based on statistical information, including, but not limited to the number of item records in the item list 32, the frequency in which the search terms appear in the item list 32, and the frequency in which the search term appears in item records. The relevance of a returned search record may be determined based on the corresponding relevance score and the relevance scores of the other item records in the search data, wherein item records 34 having a higher relevance scores are more relevant to the search criteria. Many variations to the above described method of determining a relevance score associated with a search request fall within the scope of the present invention.

The search engine server 16 generates a product list as a function of the relevance scores associated with each item record 34 and transmits the product lists to the website hosting server 14 for use in displaying the corresponding products 36 to the user via one or more search results webpages 56.

In the illustrated embodiment, the classification server 18 is programmed to perform labeling operations including assigning estimated labels 42 to item records 34. The estimated labels 42 including information associated with the item records 34. For example, in one embodiment, the estimated label 42 may include information associate with a consumer product category that may be used by the search engine server 16 for generating product lists including products being displayed to the consumer in response to a search request. In one embodiment, the classification server 18 is configured to execute a classification model to assign estimated labels to the item records 34. For example, in one embodiment, the classification server 18 may be configured to determine the estimated labels 42 as a function of the information included in the item description 40 associated with the corresponding item records 34. For example, the classification server 18 may access a list of classification labels being stored in the database 26, compare the list of classification labels with the item description 40 included in the corresponding item record 34 to generate a relevancy score associated with each classification label, and select a classification label based on the determined relevancy score. In the illustrated embodiment, the classification server 18 is programmed to access the item list 32 stored in the database 26, determine an estimate labels for each of the item records 34, and update the item records 34 included in the database 26 to include the corresponding estimated labels 42.

The trusted labeling server 20 is configure to generate and store a trusted label list 50 in the database 26 for use in evaluating an accuracy of the labeling operations being performed by the classification server 18. In one embodiment, the trusted label list 50 includes a plurality of item records 34 and a plurality of trusted labels 52 associated with each corresponding item record 34. In the illustrated embodiment, the trusted labeling server 20 is configured to receive a labeling list from the evaluation server 22 that includes item records 34 that have been selected for sampling by the evaluation server 22, determine a trusted labels 52 for each item record 34 included in the labeling list, transmit the trusted labels 52 to the evaluation server 22.

In one embodiment, the trusted labeling server 20 may receive the labeling list including item records 34, access the trusted label list 50 being stored in the database 26, and generate trusted labels 52 by comparing the item records 34 included in the labeling list with the item records 34 include in the trusted label list 50. For example, the trusted labeling server 20 may transmit trusted labels 52 associated with item identifiers 38 matching the item identifier 38 associated with the item records 34 included in the received labeling list. In another embodiment, the trusted label list 50 may include a set of item descriptions 40 including, for example, a set of descriptive terms, and a set of trusted labels 52 associated with each of the item descriptions 40. The trusted labeling server 20 may the select the trusted labels 52 matching the item descriptions 40 included with the item records 34 included in the labeling list.

In another embodiment, the trusted labeling server 20 may display the labeling list on one or more user computing device 28 to allow one or more users to assign trusted labels to the item records 34 included in the labeling list, and transmit the trusted labels 52 to the evaluation server 22. In addition, the trusted labels 52 and corresponding item records 34 may be stored in the trusted label list 50. In addition, the item list 32 may also be updated to include the assigned trusted labels 52 with the corresponding records 34.

The evaluation server 22 is programmed to monitor the operation of the classification server 18 to measure the accuracy of the classification model. For example, in one embodiment the evaluation server 22 may measure the accuracy of the estimated labels 42 being assigned by the classification server 18 with the trusted labels 52 obtained from the trusted labeling server 20.

In the illustrated embodiment, the evaluation server 22 is programmed to perform sampling operations to sample subsets of the item records 34 included it the item list 32 and determine an accuracy of the classification model as a function of the sampled subset. In one embodiment, the evaluation server 22 is programmed to receive a labeling budget value including a number of trusted labels available for use in a conducting a sampling operation. In one embodiment, the evaluation server 22 receives the labeling budget value from a user via a user computing device 28. The evaluation server 22 then determines a sampling profile 12 associated with the item records 34 including determining a selection probability for each item record 34 included in the item list 32 as a function of the current labeling budget value. The evaluation server 22 then selects a plurality of item records 34 from the item list 32 as a function of each corresponding selection probability and generates a sampling list including the selected item records 34. In one embodiment, the number of item records 34 included in the sampling list is equal to the labeling budget value.

The evaluation server 22 obtains trusted labels for each oft the item records 34 included in the sampling list, determines the estimated label associated with each item record included in the sampling list as a function of a the labeling operation performed by the classification server 18, compares the trusted labels with the estimated labels associated with the item records, and determines one or more risk measurement values 60 (shown in FIG. 6) associated with the current labeling operation as a function of the estimated labels and each corresponding current selection probabilities. The evaluation server 22 may also display an evaluation screen 62 on a user computing device 28 to display the determined sampling profile 12 and risk measurement values 60 to the user. The risk measurement values 60 may indicate an accuracy of the classification model in generating the estimated labels as compared to the trusted labels associated with the item records.

In one embodiment, the evaluation server 22 may generate a labeling list including item records include in the sampling list and transmit the labeling list to the trusted labeling server 20. The trusted labeling server 20 determines trusted labels for each item record 34 included in the labeling list and transmits the trusted labels to the evaluation server 22. The evaluation server 22 then determines the risk measurement values as a function of the received trusted labels. IN one embodiment, the labeling list includes a number of item records that is less than a number of item records included in the sampling list. For example, the evaluation server 22 may be programmed to determine if each item record 34 included in the sampling list includes a current trusted label previously associated with the corresponding item record, and generate the labeling list including item records that do not include a corresponding current trusted label.

The evaluation server 22 is also programmed to update each item record included in the item list 32 to include the corresponding selection probability, a selection indicator 46 indicating whether the item records 34 was included in the sampling list, and the corresponding trusted label 52, if assigned.

The evaluation server 22 is configured to perform a plurality of sampling operations to account of a varying number of item records 34 being included in the item list 32 over time. For example, item records 34 may be added and/or subtracted from the item list 32 and, for each item record 34 added to the item list, the classification server 18 may conduct labeling operations to assign an estimated label to each added item record 34. Overtime, as additional estimate labels are generated, the relevance of previous performance measurements of the classification server 18 is reduced.

To address these issued, in one embodiment, the evaluation server 22 may be programmed to receive a current labeling budget value from the user including an additional number of trusted labels available for use in a new sampling operation. The evaluation server 22 then determines a current selection probability for each item record included in the item list as a function of the current labeling budget value and each corresponding initial selection probability associated with the previous sampling operation. The evaluation server 22 then selects a plurality of item records from the item list as a function of each corresponding current selection probability and generates a sampling list including the selected item records, with the number of item records included in the sampling list being equal to the current labeling budget value.

The evaluation server 22 determines an estimated label associated with each item record included in the sampling list and determines a risk measurement value associated with the current labeling operation and display the risk measurement value on a user computing device, the risk measurement value being determined as a function of the estimated labels and each corresponding current selection probability In one embodiment, the evaluation server 22 may determine each current selection probability as a function of an initial budget value associated with the previous labeling operation. In addition, the evaluation server 22 may be programmed to determine each current selection probability as a function of a number of item records being included in the item list 32.

In the illustrated embodiment, the evaluation server 22 is also programmed to determine a new selection probability associated with each item record 34 included in the item list 32 as a function of the corresponding initial probability and the corresponding current selection probability, and update each item record 34 with the corresponding new selection probability for use in subsequent sampling operations.

Figure 2:
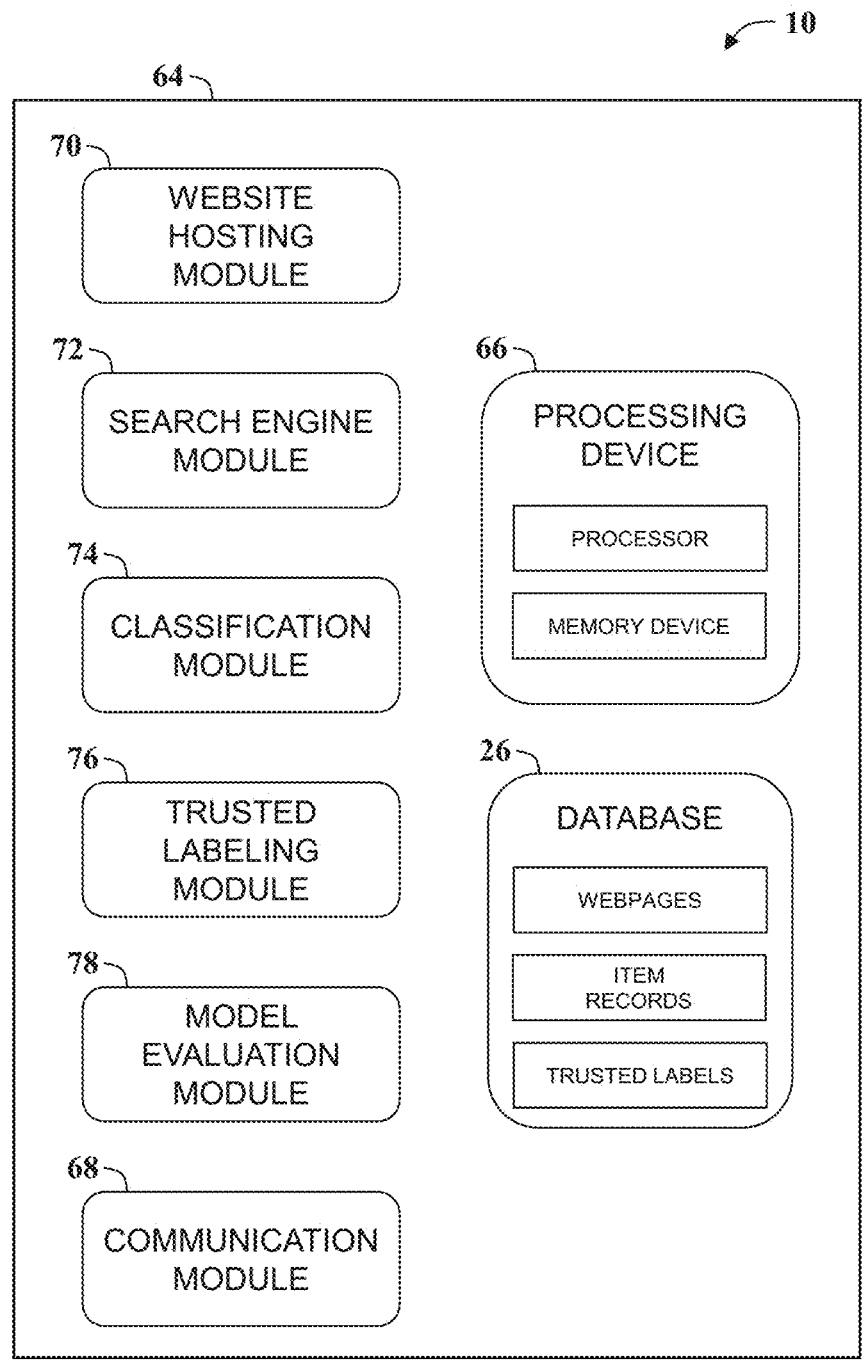
FIG. 2 is a schematic illustrating example components of a server computer, according to an embodiment of the present invention.

Referring to FIG. 2, in one embodiment, the system 10 may include a system server 64 that is configured to perform the functions of the website hosting server 14, the search engine server 16, the classification server 18, the trusted labeling server 20, the model evaluation server 22, and/or the database server 24. In the illustrated embodiment, the system server 64 includes a processing device 66 and the database 26. The processing device executes various programs, and thereby controls components of the system server 64 according to user instructions received from the user computing devices to enable users to interact with an operate the system 10. In the illustrated embodiment, the system server 64 includes a communications module 68, a website hosting module 70, a search engine module 72, a classification module 74, a trusted labeling module 76, and a model evaluation module 78.

The communications module 68 retrieves various data and information from the database 26 and sends information to the user computing device 28 via the communications network 30 to enable the user to access and interact with the system 10. In one embodiment, the communications module 68 displays various images on a graphical interface of the user computing device 28 preferably by using computer graphics and image data stored in the database 26 including, but not limited to, web pages, product records, sorted groups, product lists, and/or any suitable information and/or images that enable the system 10 to function as described herein.

The website hosting module 70 may be programmed to perform some or all of the functions of the website hosting server 14 including hosting various web pages associated with one or more websites that are stored in the database 26 and that are accessible to the user via the user computing device 28. The website hosting module 70 may be programmed to generate and display web pages associated with a website in response to requests being received from users via corresponding web browsers.

The search engine module 72 may be programmed to perform some or all of the functions of the search engine server 16 including generating and storing search data in response to the user's product search request. In addition, the search engine module 72 may also be programmed to generate a relevance score associated with each of the item records 34 included in the search data.

The classification module 74 may be programmed to perform some or all of the functions of the classification server 18 include executing a classification model to perform labeling operations to assign estimated labels 42 to item records 34. The trusted labeling module 76 may be programmed to perform some or all of the functions of the trusted labeling server 20 including generating trusted labels 52 associated with item records 34. The model evaluation module 78 may be programmed to perform some or all of the functions of the model evaluation server 22 including performing sampling operations to monitor the labeling operations performed by the classification module 74 and generating performance measurement values associated with the labeling operations.

Figure 3:
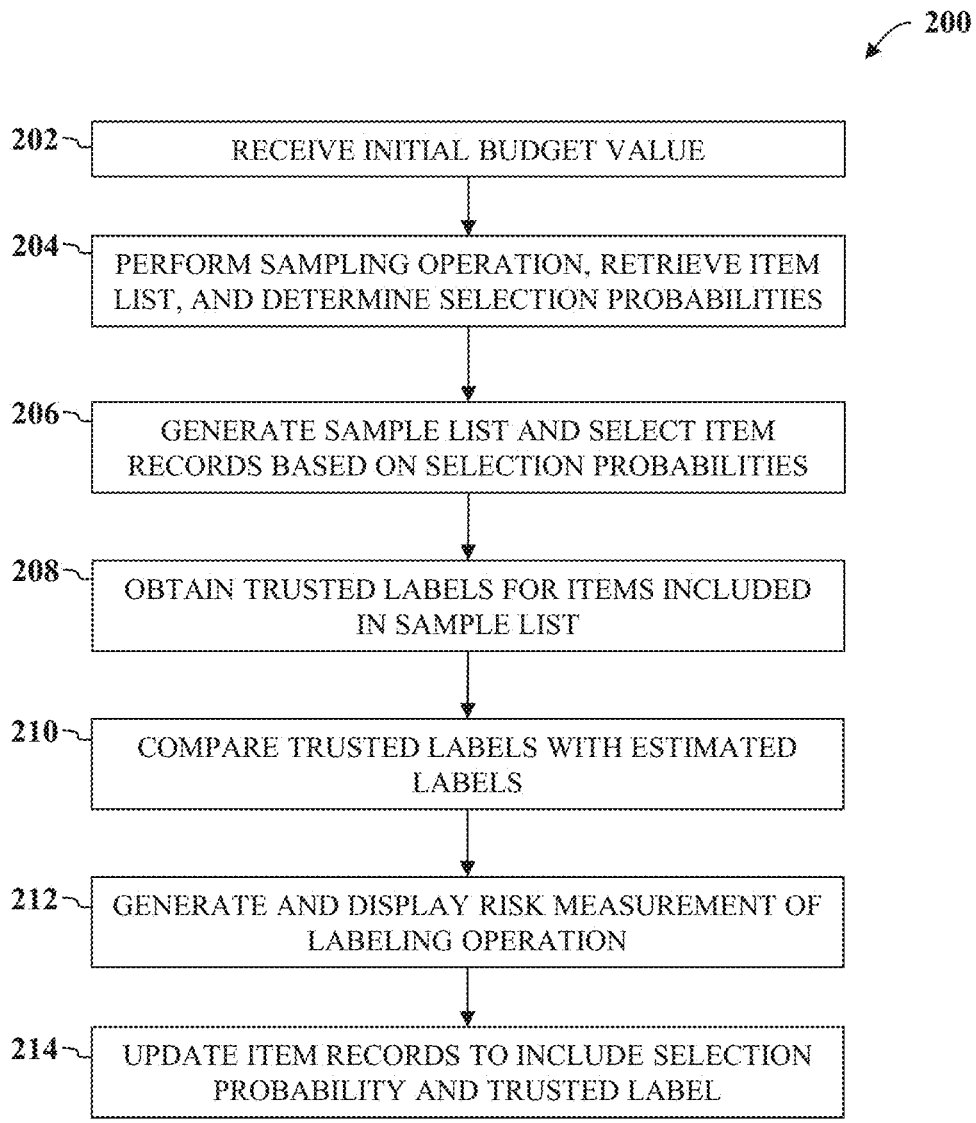
FIG. 3 is a flowchart of a method that may be used with the system shown in FIG. 1, according to an embodiment of the present invention.
Figure 4:
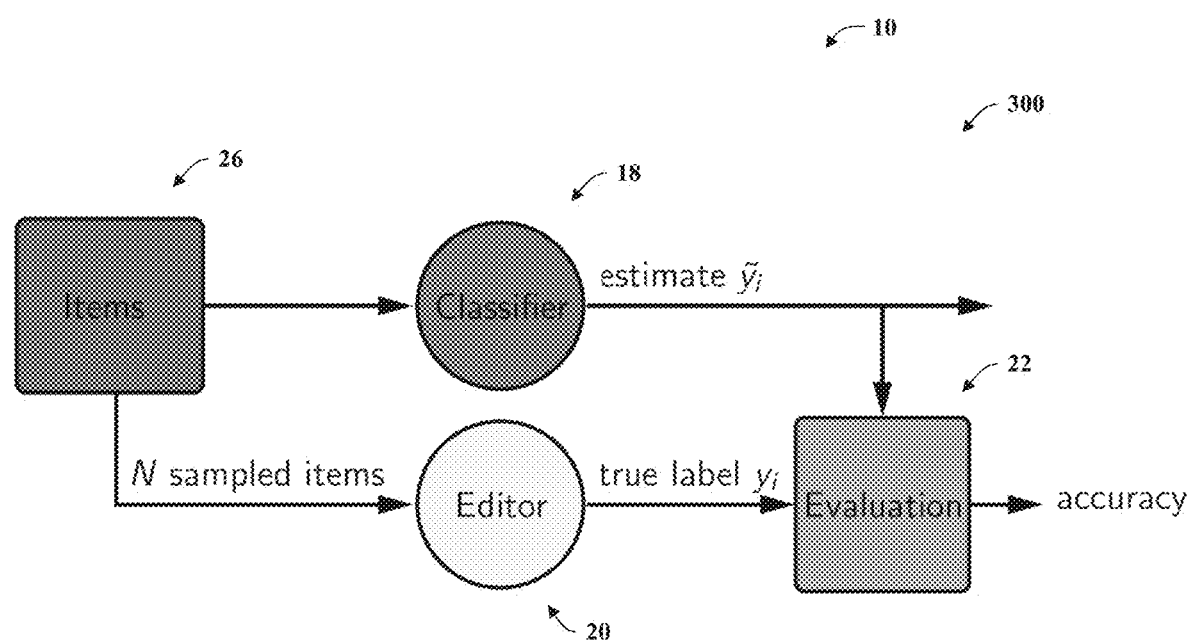
FIG. 4 is a flowchart of a method that may be used with the system shown in FIG. 1, according to an embodiment of the present invention.
Figure 5:
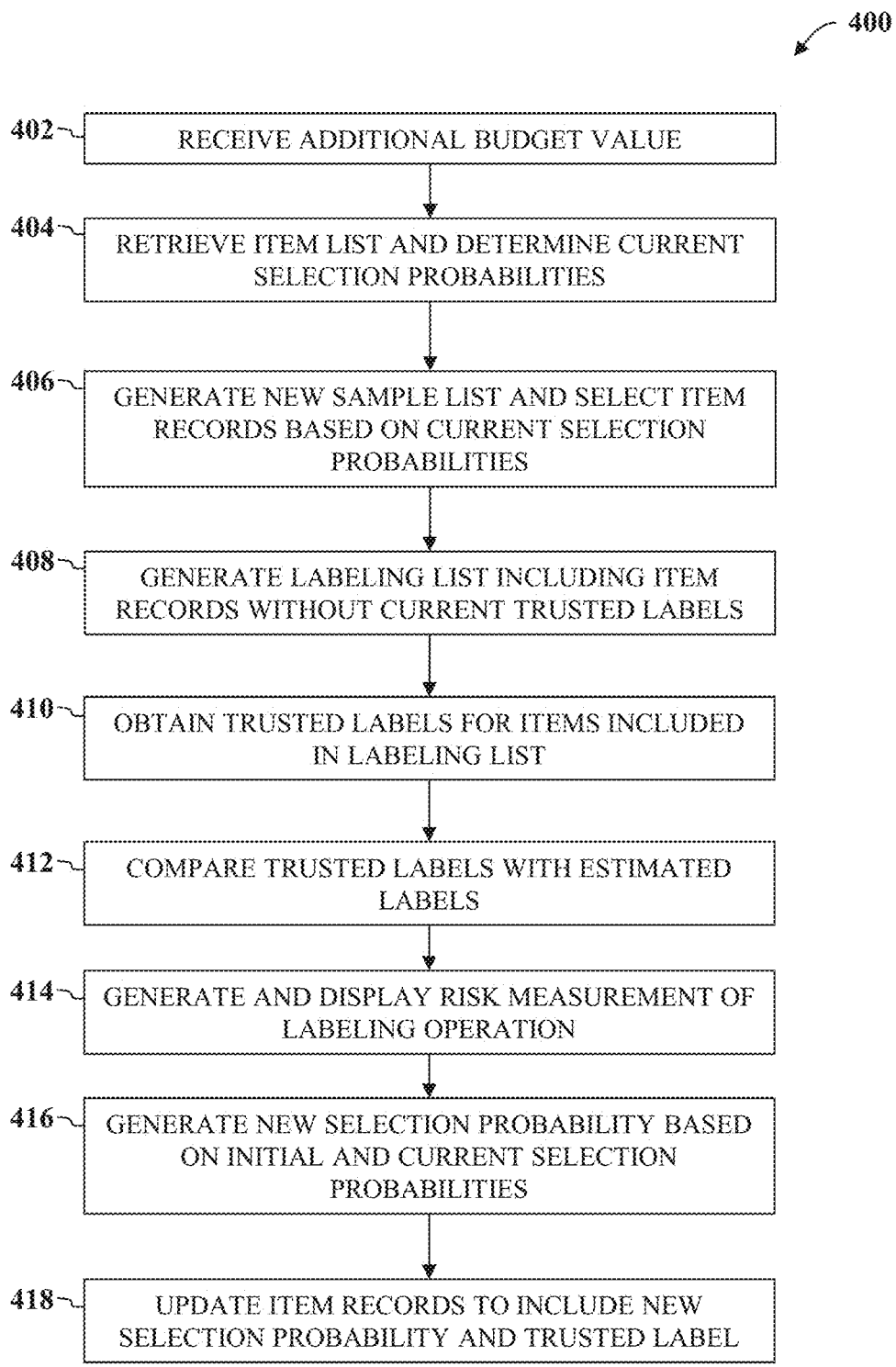
FIG. 5 is a flowchart of a method that may be used with the system shown in FIG. 1, according to an embodiment of the present invention.

FIGS. 3-5 are flowcharts of methods 200, 300, and 400 that may be used with the system 10 for monitoring an operation of a classification model that may be used to assign labels to item records used to display product information on a website. The methods include a plurality of steps. Each method step may be performed independently of, or in combination with, other method steps. Portions of the methods may be performed by any one of, or any combination of, the components of the system 10. FIGS. 6-11 are exemplary graphical displays that may be displayed by the system 10.

Referring to FIGS. 3 and 4, in the illustrated embodiment, in method step 202, the model evaluation server 22 receives a request to perform a sampling operation to monitor the performance of a labeling operation performed by the classification server 18. In one embodiment, the model evaluation server 22 receives the request from a user via a corresponding user computing device 28 including an initial labeling budget value including a number of trusted labels available for use during the sampling operation. In another embodiment, the model evaluation server 22 may receive a notification from the classification server 18 that additional item records 34 have been included in the item list 32 and initiates a sampling operation upon receiving the notification. In addition, the evaluation server 22 may monitor the item list 32 and initiate a sampling operation when a predefined number of item records 34 has been added to the item list 32 and/or a predefined period of time has elapsed since a previous sampling operation was performed. In addition, the evaluation server 22 may also be programmed to determine a labeling budget value based on the number of item records included in the item list and/or the number of additional item records that have been including in the item list since a previous sampling operation was performed.

Figure 6:
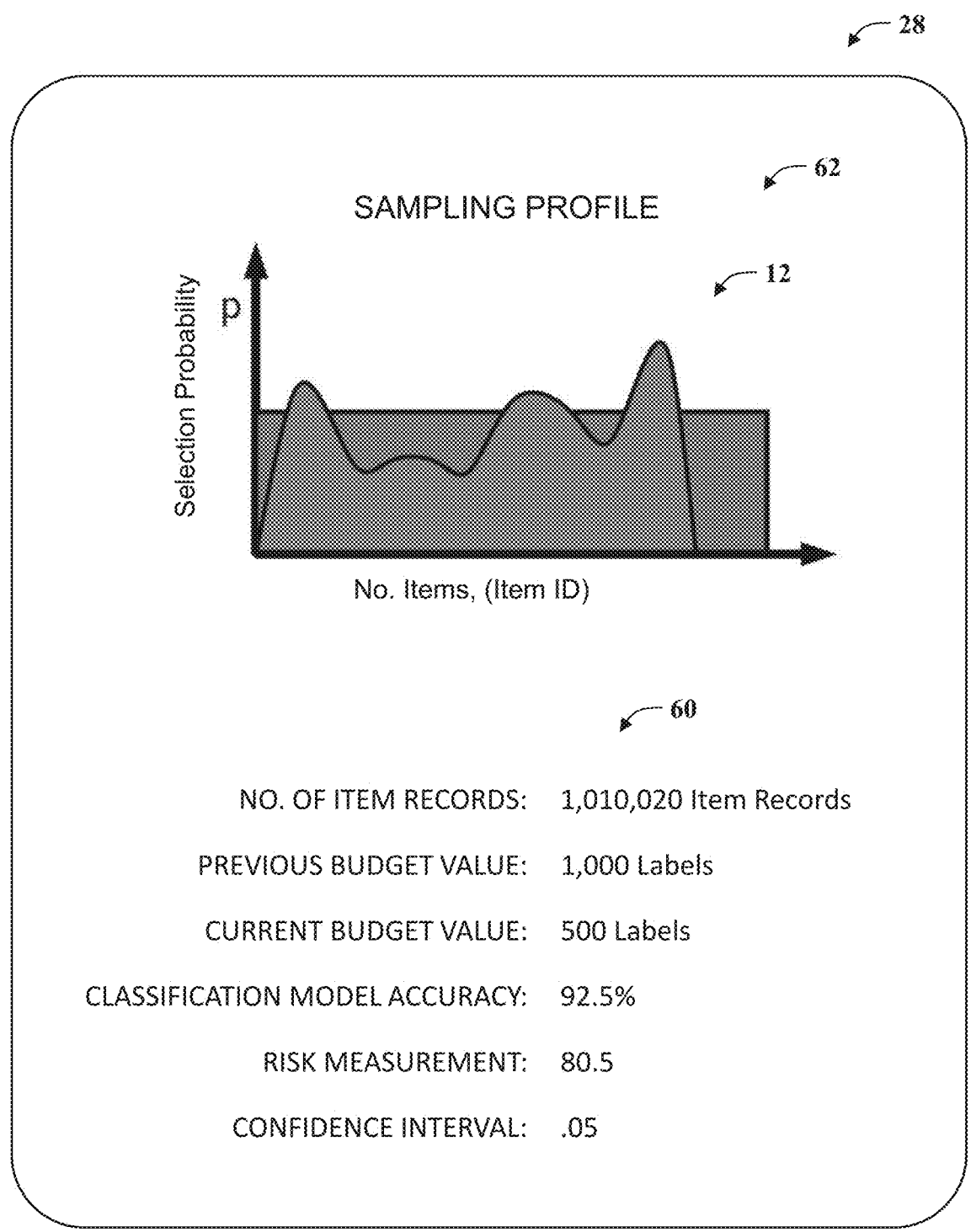
FIGS. 6-11 are illustrations of exemplary screenshots from the system of FIG. 1, according to embodiments of the present invention.
Figure 8:
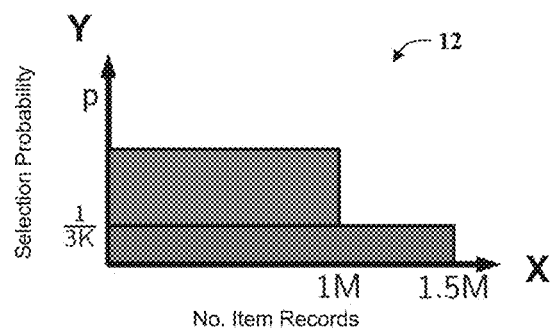
Figure 10:
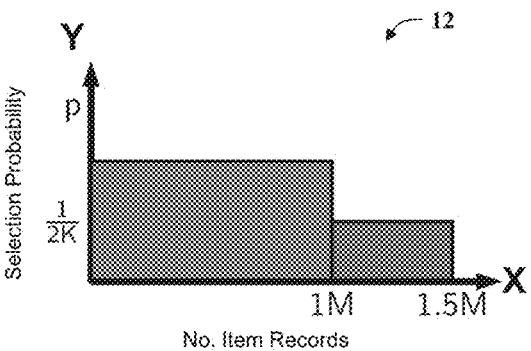

In method step 204, the evaluation server 22 initiates the sampling operation, retrieves the item list 32 from the database 26, and determines a selection probability for each of the item records 34 included in the item list 32 as a function of the labeling budget associated with the current sampling operation. In one embodiment, the evaluation server 22 may determine the corresponding selection probabilities base on a uniform sampling profile (as shown in FIGS. 7 and 9). Alternatively, the evaluation server 22 may implement a non-uniform sampling profile (as shown in FIGS. 6, 8, and 10).

In method step 206, the evaluation server 22 randomly selects item records 34 from the item list 32 as a function of each corresponding sampling probability and generates a sampling list including the selected item records 34.

In method step 208, the evaluation server 22 transmits the sampling list to the trusted labeling server 20 to obtain trusted labels for each of the item records 34 included in the sampling list. In one embodiment, the trusted labeling server 20 may accesses the trusted label list 50 being stored in the database and assign trusted labels to item records 34 having matching item identifiers 38. In another embodiment, the trusted labeling server 20 may display the sampling list to one or more user computing devices 28 to enable users to manually assign trusted labels to the item records 34 included in the displayed sampling list.

In method step 210, the evaluation server 22 compares the trusted labels associated with each item record 34 included in the sampling list with the estimated labels assigned during a classification operation performed by the classification server 18 to determine an accuracy of the classification model being used by the classification server 18.

In method step 212, the evaluation server 22 determines a risk measurement value 60 associated with the labeling operation and displays the risk measurement values to a user via a user computing device 28. In one embodiment, the evaluation server 22 may determine the risk measurement values using the following equation:

$$\overline{R} = \frac{1}{n}\sum_{i=1}^{n} l(f_\theta(x_i), y_i) \qquad \text{Equation 5}$$

where: $R$ = risk measurement value;

$n$ = number of item records included in sample list $x_i$ = estimated label $y_i$ = trusted label $l$ = loss function In method step 214, the evaluation server 22 updates the item records 34 included it the item list 32 to include the determined selection probabilities 44, a selection indicator 46 indicating if the corresponding item record was selected during the sampling operations, and a corresponding trusted label, if assigned.

Referring to FIG. 5, in one embodiment, the system 10 may be configured to perform method 400. For example, in a dynamic environment, the number of item records 34 being include in the item list may changes over time. In such situations, previous risk measurement values may become less relevant to labeling operations being performed on the current item lists. The system 10 may be configured to perform several sampling operations to address the varying size of the item list 32.

For example, in one embodiment, in method step 402, the classification server 18 may be programmed to initiate another labeling operation to provide estimated labels 42 to item records 34 that have been added to the item list 32. The evaluation server 22 may receive a request to conduct a subsequent sampling operation and receive another labeling budget including a number of trusted labels that are available for use in the current sampling operation.

In method step 404, the evaluation server 22 retrieves the item list 32 from the database 26 and determines a current selection probability 80 for each corresponding item record 34. In one embodiment, the evaluation server 22 determines the current selection probability 80 as a function of the previous selection probability 44 and the additional labeling budget value. In addition, the evaluation server 22 may determine each current selection probability 80 as a function of the previous selection probability 44, the current labeling budget value, and the previous labeling budget value used during the previous labeling operation. For example, in one embodiment, the evaluation server 22 may determine the current selection probabilities using the following equation:

$$\underset{\overline{p}_i}{\text{minimize}} \sum_{i=1}^{N} \frac{c_i}{p_i + (1-p_i)\overline{p}_i} \quad \text{Equation 6}$$

$$\text{subject to } \sum_{i=1}^{N} p_i + (1-p_i)\overline{p}_i = B + \overline{B},$$

$$0 < \overline{p}_i \le 1 \ i = 1, \ldots, N,$$

where:

$c_i = E(l_i - R)^2$ $N$ = number of item records included in sample list;

$B$ = previous labeling budget;

$\overline{B}$ = current labeling budget;

$c_i$ = previous selection probability $p_i$ = previous selection probability $\overline{p}_i$ = current selection probability In method step 406, the evaluation server 22 randomly selects item records 34 from the item list 32 as a function of the current selection probabilities 80 and generates a current sample list including the selection item records 34.

In method step 408, the evaluation server 22 reviews each item record 34 included in the current sample list including each corresponding selection indicator 46 to identify item records 34 that have been previously selected during a previous sampling operation and include previously assigned trusted labels 52. The evaluation server 22 then generates a labeling list that includes item records 34 from the sampling list that have not been previously selected, thereby reducing the total number of trusted labels that are required to perform the current sampling operation. By reducing the number of trusted labels that are required, the system 10 reduces the computing and/or human resources required to measure performance of the classification model, thereby, improving the overall computing speed of the system.

In method step 410, the evaluation server 22 transmits the item records 34 include in the labeling list to the trusted labeling server 20 and obtains trusted labels for each item record included in the labeling list.

In method step 412, the evaluation server 22 evaluates each item record included in the sampling list to compare each trusted labels 52 with an estimated label 42 associated with the corresponding item record 34 to determine an accuracy of the current labeling operation being performed by the classification server 18.

In method step 414, the evaluation server 22 determines risk measurement values 60 associated with the current labeling operation and displays the risk measurement values 60 and the sampling profile 12 to a user via a user computing device 28. In one embodiment, the evaluation server 22 may determine the risk measurement values using the following equation:

$$\hat{R}_p = \frac{1}{\sum_{i=1}^{N} \frac{Z_i}{p_i}} \sum_{i=1}^{N} \frac{Z_i}{p_i} l(f_\theta(x_i), y_i) \quad \text{Equation 7}$$

where: $\hat{R}$ = risk measurement value;

$N$ = number of item records included in sample list $Z_i$ is a Bernoulli variable $p_i$ = current selection probability $x_i$ = estimated label $y_i$ = trusted lable $l$ = loss function In method step 416, the evaluation server 22 the determines a new selection probability or each of the item records 34 included in the item list 32 and updates the item records 34 to include the new selection probability. The new selection probability is determined as function of the current selection probability 80 and the previous selection probability 44. In one embodiment, the evaluation server 22 may determine the new selection probability using the following equation:

$$p_i^{new} = p_i + (1-p_i)\overline{p}_i \quad \text{Equation 8:}$$

where: $p_i$ = previous selection probability $\overline{p}_i$ = current selection probability In method step 418, the evaluation server 22 updates the item records 34 included in the item list 32 to include the new selection probabilities, a selection indicator 46 indicating if the corresponding item record was selected during the sampling operations, and a corresponding trusted label, if assigned.

INDUSTRIAL APPLICABILITY

With reference to FIG. 1-14, operation of the system 10 according to one embodiment is shown. The system 10 may be used to monitor the operation of a classification model used to assign labels to items.

In supervised learning it's necessary to have labeled training and test data to learn and evaluate a given model. Collecting labels is generally an expensive operation and is important to minimize the number of labels required to both train and test. A common approach when a large set of unlabeled items is available, is to label a randomly selected subset of items. The labeled data is then divided between a train and a test set at random. Even though this approach is commonly used, for a given number of labeled data points it might not be optimal and it might also not work well in some practical situations that are often encountered in a production system.

For example, a common situation is for the set of items under evaluation to change over time. In this case the labeled test dataset might not be fully representative of the whole set and any evaluation of a model on it might be in error for the new set of items. A simple solution is to sample a new test data set every time an evaluation is required. This is clearly very expensive and wasteful because the previously acquired test data is not reused.

Another situation that very often arises is when multiple labeled data sets have been obtained from subsets of the whole space of items. Simply using the union of such test datasets is wrong in general because they might not be representative of the whole set of items. In this case as well, a simple solution is to sample a new test data set for evaluation. Again this approach would be expensive and wasteful.

Finally a uniform sampling of items is not always the best sampling strategy both for training and testing. For example when performing a weighted accuracy measurement the uniform sampling would add have higher variance compared to the optimal sampling strategy. Similarly when active learning is used, items to be labeled are not selected uniformly at random. The system 10, also referred to as a "label storage" system that solves all of the challenges in the above examples. In the illustrated embodiment, the system can: store labeled data and information on how it was collected; sample items for labeling optimally given a requested estimation or active learning strategy; and reuse any available labels in any successive evaluation.

The system can be used to address testing of a classification model as well as training. In one embodiment, the system addresses the problem of estimating the risk of a model and also works well in a dynamic environment with the same challenges described above.

For example, let X be the finite set of items and y the label space. Let $p(y|x; \theta)$ be a $\theta$-parametrized model and let $f_\theta: X \to Y$ with $f_\theta(x) = \arg\max_y p(y|x; \theta)$ be the corresponding hypothesis.

The system 10 provides estimates of the risk of $f_\theta$ with respect to $p(y|x)$ using the following equation:

$$R = \frac{1}{N} \sum_{i=1}^{N} \int l(f_\theta(x_i), y) p(y|x_i) dy \quad \text{Equation 9}$$

The loss function l measures the error between the prediction and the true label. In one embodiment, the system 10 may use $l_{0/1}$ loss for classification and the $l_2$ loss in regression problem, however, any other loss function can be incorporated into the system 10. The system 10 may be applied to a wide range of supervised learning problems. N is the total number of items tracked in the system and is generally very large. Moreover N can change overtime to account for new items being added and old one removed.

Computing R is in general very expensive because finding the label for a given item is expensive and N can be extremely large. Therefore R is usually approximated using:

$$\overline{R} = \frac{1}{N} \sum_{i=1}^{N} \int l(f_\theta(x_i), y_i) \quad \text{Equation 10}$$

where n is the size of the test items that are selected uniformly at random from X. The labels $y_i$ are obtained by using a trusted source.

If multiple evaluations of risk are required for X over time, over multiple subsets of X, and over multiple loss functions using Equation 10 with a fresh uniform sample can be extremely expensive and impractical. Moreover the uniform sampling of test items is generally not the optimal sampling strategy in order to minimize the variance of the risk estimation.

The "label storage" system 10. In the illustrated embodiment, the "label storage" system 10 makes it possible to both reuse previously collected samples while optimizing for the variance of the risk estimation. The "label storage" system 10 stores an entry for all the items in X. Each item i is associated with a probability $p_i$ that is the probability with which the item will be sampled to be part of the test sample using a Bernoulli process. When estimating the risk R of a model, the system 10 computes a set of probabilities p>0 for each item and stores it. The risk is then estimated using:

$$\hat{R}_p = \frac{1}{\sum_{i=1}^{N} \frac{Z_i}{p_i}} \sum_{i=1}^{N} \frac{Z_i}{p_i} l(f_\theta(x_i), y_i) \quad \text{Equation 11}$$

where $Z_i$ is a Bernoulli variable with probability $p_i$.

Labels will have to be obtained only for items where $Z_i=1$. The total set of labels to be obtained is in expectation $\Sigma_{i=1}^{N} p_i$. $B = \Sigma_{i=1}^{N} p_i$ is the label budget which is the expected number of labels to be queried for a given set of $p_i$s. The system 10 records for each item whether or not it was selected and the corresponding label if one was collected.

Notice that $\hat{R}_p$ is a probability distribution that depends on the $Z_i$. This expression is very similar to what in importance sampling and is referred to as a self-normalized sampler and similar results can be obtained for both. Notice also that for $$p_i = \frac{1}{N},$$

$\hat{R}_p$ becomes that standard estimate $\overline{R}$. Another estimate that can be used by the system is $$\tilde{R}_p = \frac{1}{N} \sum_{i=1}^{N} \frac{Z_i}{p_i} l(f_\theta(x_i), y_i) \quad \text{Equation 12}$$

This is an unbiased estimate of R but has in general a bigger variance compared to $\hat{R}_p$. It's clear that for $\Sigma_{i=1}^{N} p_i \to N$ the expected value of the estimate $\hat{R}_p$ converges to R and therefore $\hat{R}_p$ can be a consistent estimator for R.

Minimize estimate variance. The system 10 may also select $p_i$s for a given budget B to minimize the variance of the estimate over R. For example, the system 10 may minimize the variance:

$$\text{Var}(\hat{R}_p) = \text{Var}\left(\frac{1}{\sum\limits_{i=1}^{N} W_i} \sum_{i=1}^{N} W_i l_i\right) \quad \text{Equation 13}$$

where $$W_i = \frac{Z_i}{p_i}, l_i = l(f_\theta(x_i), y)$$

and the expectation is over $Z_i$ and $p(y|x)$.

Using the approximation:

$$\text{Var}(P/S) \approx \frac{\mu_P^2}{\mu_S^2}\left[\frac{\sigma_P^2}{\mu_P^2} - 2\frac{\text{Cov}(P,S)}{\mu_P \mu_S} + \frac{\sigma_S^2}{\mu_S^2}\right] \quad \text{Equation 14}$$

the following equation can be obtained:

$$\text{Var}(\hat{R}_p) \approx \frac{1}{N^2} \sum_{i=1}^{N} \left(\frac{1}{p_i} - 1\right) E(l_i - R)^2 \quad \text{Equation 15}$$

To find the optimal set of $p_i$ the system 10 solves the optimization problem:

$$\min_{p_i} \sum_{i=1}^{N} \frac{c_i}{p_i} \quad \text{Equation 16}$$

$$\text{subject to } \sum_{i=1}^{N} p_i = B,$$

$$0 < p_i \leq 1\, i=1, \ldots, N,$$

where $c_i = E(l_i - R)^2$.

This can be solved efficiently using bisection over the dual variable. Because R and $El_i$ may not be known because they depend on $p(y|x)$, practically the system 10 may replace R with the introspective risk:

$$R_\theta = \frac{1}{N} \sum_{i=1}^{N} \int l(f_\theta(x_i), y) p(y|x_i; \theta) dy \quad \text{Equation 17}$$

and $p(y|x)$ with $p(y|x; \theta)$.

Classification. The system 10 may also compute the optimal set of $p_i$s for classification when using $l_{0/1}$. Using the term $E(l_{0/1}(f_\theta(x_i),y)-R_\theta)^2$.

$$El_{0/1}(f_\theta(x_i), y)^2 = \sum_{y \in (Y)} l_{0/1}(f_\theta(x_i), y) p(y|x_i; \theta) \quad \text{Equation 18}$$

$$= \sum_{y \neq f_\theta(x_i)} p(y|x_i; \theta)$$

$$= 1 - p(f_\theta(x_i)|x_i; \theta)$$

Similarly using $El_{0/1}(f_\theta(x_i), y) = 1 - p(f_\theta(x_i)|x_i; \theta)$ arrives at $$E(l_{0/1}(f_\theta(x_i),y)-R_\theta)^2 = (1-p(f_\theta(x_i)|x_i;\theta))(1-2R_\theta)+R_\theta^2 \quad \text{Equation 19:}$$

Equation 19 illustrates items for which $1-p(f_\theta(x_i)|x_i; \theta)$ is bigger will be sampled with higher probabilities. In other words items where the model is more uncertain will have a higher chance of being sampled.

Using previously obtained labels. In the illustrated embodiment, the system 10 may also address the problem of reusing previous labels as it performs multiple estimations over time. Assuming that one evaluation has already been performed in the system. Each item will have a probability $p_i$ assigned to it, some of the items will have been marked as selected by the sampling and will also have a label assigned to them. At this point if new items are added to the system will be assigned a zero probability. Items can also be removed as well.

If a new estimate needs to be computed and the system has $p_i > 0$ for $i=1, \ldots, N$ the system 10 may apply Equation 11 and produce an estimate. For this new estimate l may be a different function form the previously used one. The only requirement is that $p_i > 0$ for $i=1, \ldots, N$.

If an evaluation is not possible because one probability is zero or if a tighter confidence interval is required, the system can sample $\overline{B}$ more items to be labeled. To do so the system 10 computes a new set of probabilities called $\overline{p}_i$ samples each item using them. The labels of the items that are sampled will be recorded and marked as selected. The system 10 may sample the same items more than once. In this case the label would already be available and no extra work should be performed.

Since the overall probability with which an item is selected is now $p_i+(1-p_i)\overline{p}_i$, leveraging Equation 16, the system 10 may compute $\overline{p}_i$ by solving the optimization problem $$\min_{\overline{p}_i} \sum_{i=1}^{N} \frac{c_i}{p_i + (1-p_i)\overline{p}_i} \quad \text{Equation 21}$$

$$\text{subject to } \sum_{i=1}^{N} p_i + (1-p_i)\overline{p}_i = B + \overline{B},$$

$$0 < \overline{p}_i \leq 1\, i=1, \ldots, N,$$

where $c_i = E(l_i - R)^2$ and $\overline{B}$ is the new budget that is used on top of the preexisting set of labels.

Notice that this optimization is with respect to $\overline{p}_i$ samples and the $p_i$ are the given preexisting probability from previous rounds. This problem may also be solved very efficiently by using bisection on the dual variable.

In addition, the recorded probability $p_i$ for each item will be updated in the system 10 using $$p_i^{new} = p_i + (1-p_i)\overline{p}_i \quad \text{Equation 22:}$$

$p_i^{new}$ is the overall probability of being selected for the item over the 2 rounds of evaluation. Applying Equation 11 on the new set of labels and new $p_i$s will give the new estimate. This shows how the system 10 can optimize for a new given budget on top of the set of existing tags. It's also clear how the system 10 will work overtime as new estimate request are needed. It's also important to notice that the evaluations overtime can be performed over subsets of X.

Confidence interval. The system 10 may also provide a confidence interval for the estimate $\hat{R}_p$. There are multiple ways to do it but a simple one is to compute the empirical estimate of the variance of $\hat{R}_p$ as:

$$\frac{1}{\left(\sum_{i=1}^{N}\frac{Z_i}{p_i}\right)^2}\sum_{i=1}^{N}\frac{Z_i^2}{p_i^2}(l(f_\theta(x_i),y_i))-\hat{R}_p)^2 \qquad \text{Equation 23}$$

Using the variance estimate the system 10 can then compute a symmetric confidence interval around the estimate.

Train/test sets management. Given a set of labels is generally necessary to split them between a test and a train set. The train set is used to train the model and the test set can be used to estimate the risk. Up to this point it has been assumed that all the labels could be used to estimate the risk. The system can automatically divide the set of items into 2 groups. The first group is dedicate to items that when labeled will be used for training while the second group contains items that when labeled will be used for testing. Each item is assigned a certain probability of being in the test group and then a random sampling is performed to split the groups. By default this probability is selected so that the test group is 10% of the total set of items. The system can recompute the groups and use any arbitrary set of probabilities. These probabilities used for sampling items in the test group are recorded in order to account for them while making any estimation.

In one embodiment, it may not always be possible to obtain a label for a given item because the person in charge might not have enough knowledge to assign a label. It is generally easier for a human labelers to accept or reject a given label. For certain loss functions, like for example the $l_{0/1}$ loss, the rejection of a label is still useful to compute the risk. For this reason the system may store rejections and during evaluation and use them if the loss function allows it. The system can also be used not just to evaluate risk of a given model but also for training. In fact an identical problem arises in active learning when trying to select item to label to improve model performance. The weights that are then created by the system can be used during training to account for the non uniform selection of items.

Labels may also have different source. As an example labels could have been assigned by a highly trained group of editors or through some crowd source service. Clearly the quality of the labels can vary drastically between sources. For this the source of a label is stored as well. The system can merge source of labels or compare one of them against another one. As an example is not just possible to evaluate the accuracy of a ML model but the system can also evaluate the accuracy of a crowd source platform by using editorially reviewed tags.

The system 10 described herein stores labeled data and estimates the risk of a model over a set of arbitrary items. This system can optimally sample items to be labeled in order to minimize the variance of the estimator. It can also reuse existing labels to provide new estimates at a minimum cost.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. An evaluation server computer for use in monitoring an operation of a classification server computer, the classification server computer configured to perform labeling operations including assigning respective estimated labels to respective item records, the respective estimated labels for use in a search engine and including respective information associated with the respective item records, the evaluation computer server computer comprising:
a database including an item list including a plurality of item records, each respective item record of the plurality of item records including a respective initial selection probability associated with a respective previous sampling operation; and
a processing device including a processor coupled to a memory device, the processor programmed to:
receive a first number of trusted labels available for use in a current sampling operation;
determine a respective current selection probability for each respective item record of the plurality of item records included in the item list, the respective current selection probability being a function of:
the first number of trusted labels; and
each respective corresponding initial selection probability of each respective label of the first number of trusted labels;
select a respective portion of the plurality of item records from the item list as a function of each respective corresponding current selection probability of each respective label of the first number of trusted labels;
generate a sampling list including the respective portion of the plurality of item records, wherein a number of the plurality of item records in the sampling list is equal to the first number of trusted labels;
determine a respective estimated label associated with each respective item record of the plurality of item records in the sampling list, wherein each respective estimated label is determined as a function of a current labeling operation performed by the classification server computer;
generate a training group and a testing group using each respective item record of the plurality of item records in the sampling list;
train an accuracy model on the training group, the accuracy model configured to output an accuracy associated with the current labeling operation;
determine the accuracy associated with the current labeling operation using the accuracy model and the testing group;
display the accuracy associated with the current labeling operation on an operator computing device, wherein the accuracy associated with the current labeling operation is determined as a function of:
the respective estimated labels; and
each respective corresponding current selection probability;
update at least one of the respective item records to include at least one of the respective estimated labels as a respective new trusted label of the first number of trusted labels for the at least one of the respective item records;
receive a search query from a user computing device;
analyze the search query using the search engine; and
return an item record of the respective item records, as updated, to the user computing device in response to the search query, wherein:
the accuracy associated with the current labeling operation indicates an accuracy of the respective estimated labels as compared to trusted labels associated with the plurality of item records; and
the plurality of item records are configured to be displayed to a consumer on a website in an ordered list based on a relevancy score in response to receiving a product search request received via the website.

2. An evaluation server computer in accordance with claim 1, wherein the processor is further programmed to:
determine each respective corresponding current selection probability of each respective label of the first number of trusted labels as a function of a second number of trusted labels associated with the respective previous sampling operation.

3. An evaluation server computer in accordance with claim 1, wherein the processor is further programmed to:
determine each respective corresponding current selection probability of each respective label of the first number of trusted labels as a function of the number of the plurality of item records included in the item list.

4. An evaluation server computer in accordance with claim 1, wherein the processor is further programmed to:
determine the accuracy associated with the current labeling operation as a function of the number of the plurality of item records included in the item list.

5. An evaluation server computer in accordance with claim 1, wherein:
the processor is further programmed to:
generate a labeling list including the plurality of item records in the sampling list;
transmit the labeling list to a labeling server computer; and
receive respective trusted labels for each respective item record in the labeling list; and
determine the accuracy associated with the current labeling operation further comprises:
determine the accuracy associated with the current labeling operation as a function of the respective trusted labels, as received.

6. An evaluation server computer in accordance with claim 1, wherein:
the plurality of item records include information associated with consumer products.

7. An evaluation server computer in accordance with claim 1, wherein the processor is further programmed to:
update each respective item record of the training group to indicate a respective associated group selected from the training group or the testing group; and
update each respective item record of the testing group to indicate a respective associated group selected from the training group or the testing group.

8. An evaluation server computer in accordance with claim 1, wherein:
the training group comprises respective trusted labels assigned to each respective item record of the plurality of item records in the sampling list, as received; and
the testing group comprises respective estimated labels as determined for each respective item record of the plurality of item records in the sampling list.

9. An evaluation server computer in accordance with claim 1, wherein the accuracy model comprises:

a loss function configured to measure error between respective trusted labels assigned to each respective item record of the plurality of item records in the sampling list, as received, and estimated labels as determined for each respective item record of the plurality of item records in the sampling list.

10. An evaluation server computer in accordance with claim 1, wherein processor is further programmed to:
receive, from the operator computing device, a respective trusted label for at least one respective item record of the plurality of item records, the respective trusted label determined using the accuracy associated with the current labeling operation; and
store the respective new trusted label in the database.

11. An evaluation server computer in accordance with claim 1, wherein:
analyze the search query using the search engine further comprises:
comparing the search query to the respective new trusted label of the first number of trusted labels to generate the relevance score for the at least one of the respective item records.

12. A networked computer system including:
a classification server computer including a first processor programmed to perform labeling operations including assigning respective estimated labels to respective item records, the respective estimated labels for us in a search engine and including respective information associated with the respective item records;
a database including an item list including a plurality of item records, each respective item record of the plurality of item records including a respective initial selection probability associated with a respective previous sampling operation; and
an evaluation server computer including a second processor programmed to:
receive a first number of trusted labels available for use in a current sampling operation;
determine a respective current selection probability for each respective item record of the plurality of item records included in the item list, the respective current selection probability being a function of:
the first number of trusted labels; and
each respective corresponding initial selection probability of each respective label of the first number of trusted labels;
select a respective portion of the plurality of item records from the item list as a function of each respective corresponding current selection probability of each respective label of the first number of trusted labels;
generate a sampling list including the respective portion of the plurality of item records, wherein a number of the plurality of item records in the sampling list is equal to the first number of trusted labels;
determine a respective estimated label associated with each respective item record of the plurality of item records in the sampling list, wherein each respective estimated label is determined as a function of a current labeling operation performed by the classification server computer;
generate a training group and a testing group from each respective item record of the plurality of item records in the sampling list;
train an accuracy model on the training group, the accuracy model configured to output an accuracy associated with the current labeling operation;
determine the accuracy associated with the current labeling operation using the accuracy model;
display the accuracy associated with the current labeling operation on an operator computing device, the accuracy associated with the current labeling operation being determined as a function of:
the respective estimated labels; and
each respective corresponding current selection probability
update at least one of the respective item records to include at least one of the respective estimated labels as a respective new trusted label of the first number of trusted labels for the at least one of the respective item records;
receive a search query from a user computing device;
analyze the search query using the search engine; and
return the at least one of the respective item records of the respective item records, as updated, to the user computing device in response to the search query, wherein:
the accuracy associated with the current labeling operation indicates an accuracy of the respective estimated labels as compared to trusted labels associated with the plurality of item records; and
the plurality of item records are configured to be displayed to a consumer on a website in an ordered list based on a relevancy score in response to receiving a product search request received via the website.

13. A networked computer system in accordance with claim 12, wherein the second processor is further programmed to:
determine each respective corresponding current selection probability of each respective label of the first number of trusted labels as a function of a second number of trusted labels associated with the respective previous sampling operation.

14. A networked computer system in accordance with claim 12, wherein the second processor is further programmed to:
determine each respective corresponding current selection probability of each respective label of the first number of trusted labels as a function of the number of the plurality of item records included in the item list.

15. A networked computer system in accordance with claim 12, further comprising a labeling server computer comprising a third processor, the labeling computer server configured to provide trusted labels associated with item records, the third processor is programmed to:
generate a labeling list including the plurality of item records in the sampling list; and
transmit the labeling list to the labeling server computer, wherein:
the labeling server computer is programmed to:
determine a respective trusted label for each respective item record of the plurality of item records in the labeling list; and
transmit the respective trusted label for each respective item record of the plurality of item records to the evaluation server computer; and
the evaluation server computer is programmed to determine the accuracy associated with the current labeling operation as a function of the respective trusted label for each respective item record of the plurality of item records, as received.

16. A networked computer system in accordance with claim 12, wherein:

the plurality of item records include information associated with consumer products.

17. A networked computer system in accordance with claim 12, wherein the second processor is further programmed to:
update each respective item record of the training group to indicate a respective associated group selected from the training group or the testing group; and
update each respective item record of the testing group to indicate a respective associated group selected from the training group or the testing group.

18. A networked computer system in accordance with claim 12, wherein:
the training group comprises respective trusted labels assigned to each respective item record of the plurality of item records in the sampling list, as received; and
the testing group comprises respective estimated labels as determined for each respective item record of the plurality of item records in the sampling list.

19. A networked computer system in accordance with claim 12, wherein the accuracy model comprises:
a loss function configured to measure error between respective trusted labels assigned to each respective item record of the plurality of item records in the sampling list, as received, and estimated labels as determined for each respective item record of the plurality of item records in the sampling list.

20. A networked computer system in accordance with claim 12, wherein the second processor is further programmed to:
receive, from the operator computing device, a respective trusted label for at least one respective item record of the plurality of item records, the respective new trusted label determined using the accuracy associated with the current labeling operation; and
store the respective new trusted label in the database.

* * * * *